United States Patent

[11] 3,592,421

| [72] | Inventor | Gerhard Kopp<br>Munich, Germany |
| --- | --- | --- |
| [21] | Appl. No. | 741,591 |
| [22] | Filed | July 1, 1968 |
| [45] | Patented | July 13, 1971 |
| [73] | Assignee | Entwicklungsring Sud GmbH<br>Munich, Germany |
| [32] | Priority | July 18, 1967 |
| [33] | | Germany |
| [31] | | E 34 414 XI/62b |

[54] APPARATUS FOR MOUNTING JET ENGINES
11 Claims, 14 Drawing Figs.

[52] U.S. Cl. ............................................. 248/5,
244/54
[51] Int. Cl. .......................................... B64d 27/00
[50] Field of Search ............................................. 248/5;
60/39.31; 244/54, 56, 5

[56] References Cited
UNITED STATES PATENTS

| 2,529,955 | 11/1950 | Morley ........................ | 248/5 |
| 2,815,184 | 12/1957 | Westphal et al. ............. | 244/54 |
| 3,042,349 | 7/1962 | Pirtle et al. ................... | 248/5 |

*Primary Examiner*—Roy D. Frazier
*Assistant Examiner*—J. Franklin Foss
*Attorney*—William K. Serp ABSTRACT: A mounting apparatus for supporting the jet engines of a vertical takeoff and landing aircraft. The engine is supported by mounting rods which are oriented in planes normal to each other. Supporting the engine rearwardly of the mounting rods are thrust pins which include locking means to prevent their accidental loosening. The rods and thrust pins are retained in their desired positions after removal of the engine to facilitate maintenance of the engine and remounting.

APPARATUS FOR MOUNTING JET ENGINES

BACKGROUND OF THE INVENTION

This invention generally relates to an engine mount particularly adapted for supporting the jet engines of short or vertical takeoff aircraft. The engines of such aircraft are often subject to very large temperature variations resulting in thermal expansion of the various components thereof. As a result of such extreme temperature variations, the engines require a mounting which maintains the longitudinal axes of the engines in alignment during thermal expansion. Even a slight displacement of the longitudinal axis of the engine may cause engine misalignment which may adversely affect flight performance. Loss of engine thrust is generally in proportion to the extent of the misalignment; and, in addition, such misalignment may produce interaction between the engine and the airframe. The various arrangements heretofore used for minimizing engine misalignment have generally included extremely complex design features in order to assure sealing between the engine and the air inlets.

The illustrated embodiment overcomes certain of these disadvantages by providing mounting rods for supporting the engine in two planes, either above or below the engine axis, and also includes one or more thrust pins having retaining means to prevent their accidental loosening. The mounting apparatus additionally includes means for retaining the mounting rods and thrust pins in their desired positions after removal of the engines for maintenance purposes.

The features of the mounting apparatus substantially prevent any change in the position of the engine's longitudinal axis which may be brought about, for example, due to thermal expansion. Since the engine is held in longitudinal alignment by means of a thrust pin, generally only longitudinal displacement results. One embodiment which includes features of the invention provides a mounting plane adjacent to the engine deflecting nozzle. The mounting means includes two rods located at both sides of the engine with their longitudinal axes oriented normal to the Y-axis of the aircraft. The mounting means further includes a thrust pin, the axis of which is oriented along the Z-axis. It is additionally proposed that, in the mounting plane adjacent to the engine inlets, a second mounting rod is provided which is oriented perpendicular to the Y-axis, and a third mounting rod is provided normal to the Z-axis of each engine.

With respect to the illustrated alternate embodiment of the invention, the mounting rods are provided with spherical joints at each end, and the thrust pins are designed with spherical joints at that end associated with the engine and are freely movable in their axial direction. These features result in a static positioning of the entire engine mount. The spherical design of the mounting rod ends and of the thrust pins facilitates the compensation of longitudinal expansion of the engines in a relatively simple manner and additionally provides a means for compensating for various manufacturing tolerances.

With respect to a second alternate embodiment of the invention, it is proposed that the mounting rods located in the plane adjacent the nozzle and the thrust pins be constructed as an integral structural unit with the forward support mechanism of the deflecting nozzle. The jet engine used in a short or a vertical takeoff aircraft is normally provided with an overhang which varies in accordance with the type of thrust deflection used. This insures that the bending moment resulting from the overhang will be kept as small as possible.

The illustrated embodiment also includes flexible parts for centering, restraining, guiding, and positioning the thrust pins and the mounting rods. With respect to prior known constructions, equipment damage has often occurred during engine changes due to the fact that the attaching elements which are disconnected on either the engine or the fuselage are accidentally moved, thereby damaging the fuselage or the engine parts.

In accordance with the illustrated embodiment, the mounting means includes provisions for retaining the mounting rods, as well as the thrust pins in the position maintained at the time of engine removal. Therefore, in the removed condition, the thrust pins project beyond the outer contour of the aircraft; and, due to their conspicuousness, decrease the possibility of incorrect reassembly.

Prior arrangements which utilize spherical attaching elements have an inherent disadvantage in that they are capable of shifting position during the connecting operation and thus complicate installation of the engine. The illustrated embodiment substantially overcomes this difficulty in that it includes a centering disc which is notched and flexibly retains the mounting rods in their centered position by means of three fingers which rest upon a spring steel ring. The disc defines two notches which are engaged with a serrated screw head at the fixed point of the mounting rod and thereby permit retention of the rod setting corresponding to increments defined by a multiple cornered bolt head. In order to permit centering and retention of the thrust pin, the spherical end thereof is supported in a three-piece, double-tapered ring.

A main object of the invention is to provide an improved mounting apparatus for the jet engines of vertical takeoff and landing aircraft. Other objects and advantages will become apparent with reference to the following description and accompanying drawings which show illustrative embodiments of this invention.

DESCRIPTION OF THE PREFERRED EMBODIMENTS

Figure 1:
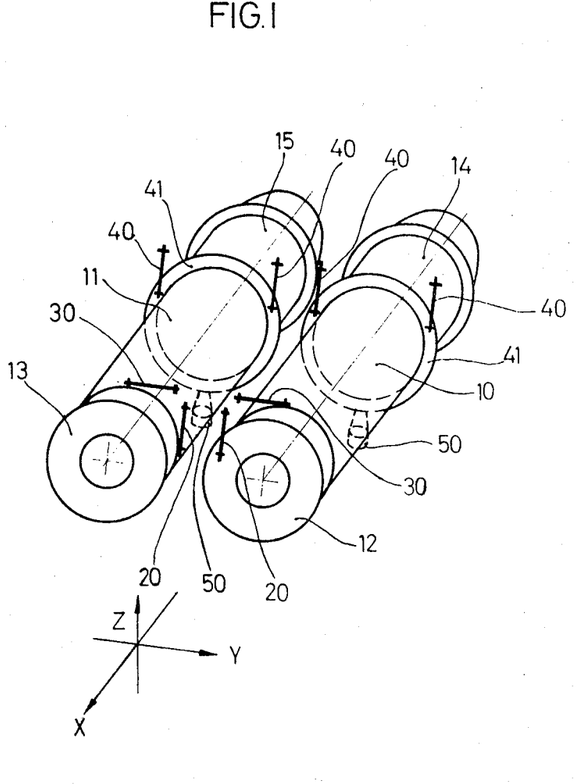
FIG. 1 is a schematic representation of a dual-engine aircraft installation with a mounting apparatus including certain features of this invention.

With respect to FIG. 1, a schematic representation of a mounting apparatus including certain features of this invention is shown in combination with a dual-engine aircraft installation for illustrative purposes. Secured to each engine 10 and 11 in the mounting planes adjacent engine inlets 12 and 13 is a single mounting rod 20 which is normal to the Y-axis and a mounting rod 30 which is normal to the Z-axis. Directly located on the first point support of the engine nozzles 14 and 15 and on both sides of the engines 10 and 11 are also mounting rods 40 which are normal to the Y-axis. In this second mounting plane, there is also a thrust pin 50 which is positioned in the Z-axis of the engine. If desired, the engine nozzles may also be designed as deflecting nozzles.

Figure 2:
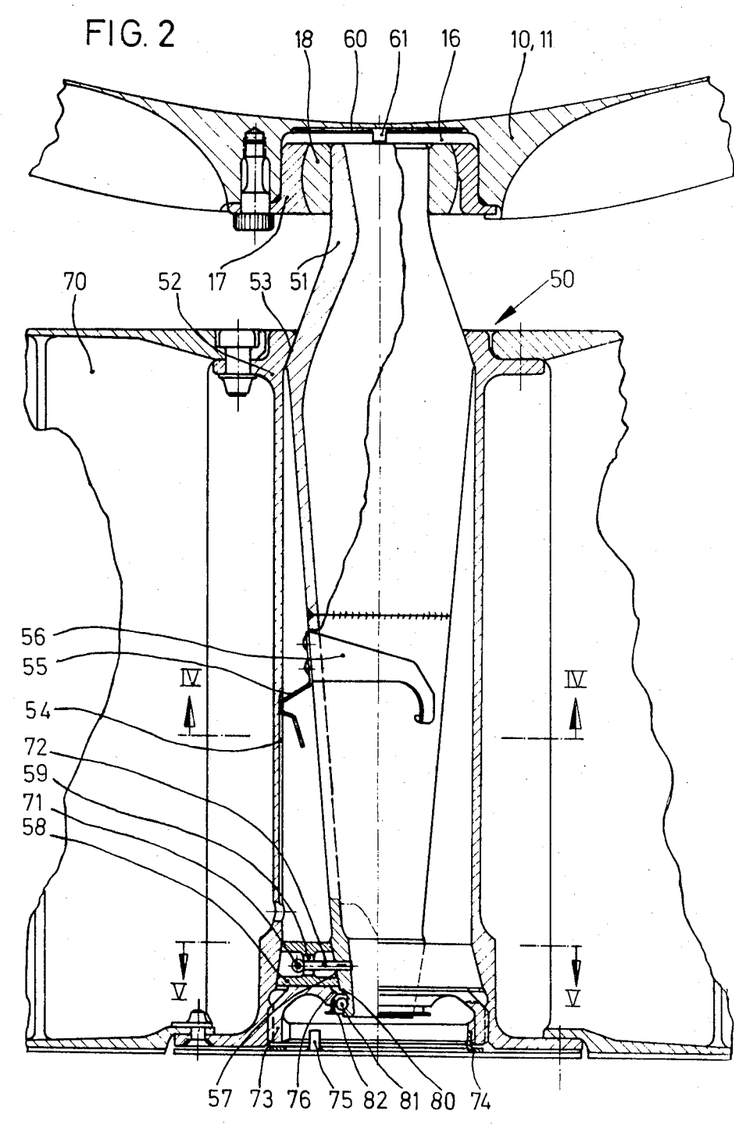
FIG. 2 is a partial, sectional view through a component of the embodiment of FIG. 1.

FIG. 2 is an illustration of a thrust pin. A spherical joint is provided which includes a bushing 17. The bushing is positioned in a hole 16 bored in the walls of the engines 10 and 11 and fixed thereto. Completing the joint is a spherical bearing ring 18 which is partially surrounded by the bushing. The bearing ring 18 defines a circular opening which provides sliding support for an upper end 51 of the thrust pin 50 so as to compensate for thermal expansion and manufacturing tolerances which may be present. Serving to position the spherical joint which compensates for angular inaccuracies and to provide central flexibility, a ring 60 is provided which includes three flexible projections 61. The projections act upon the bearing ring 18, as will hereinafter be further described.

Figure 4:
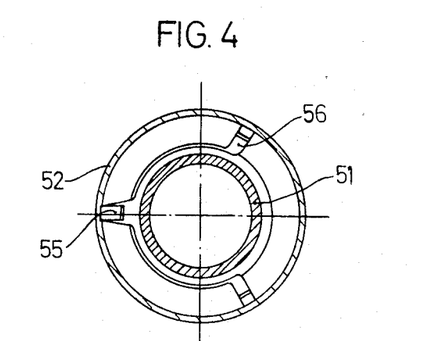
FIG. 4 is a sectional view taken along the line IV-IV of FIG. 2.

Within a fuselage frame 70, is a housing 52. The shaft of the thrust pin 51 is inserted into the housing 52 until the tapered surface 53 is brought to bear upon the shaft. The housing wall defines a guide groove 54 which engages with a locking spring 55 (FIG. 4) so as to detachably retain the thrust pin 50 within the housing during assembly. Three locking springs 56 center the shaft of the thrust pin 51 in the disassembled position. These locking elements 55 and 56 are secured to the shaft.

Figure 5:
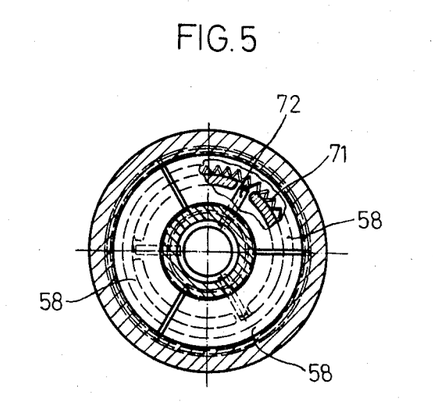
FIG. 5 is a sectional view taken along the line V-V of FIG. 2.

The lower end of the shaft is tapered and includes a bearing surface 57 that preferably is supported in three segments of a double tapered ring 58, as illustrated in FIGS. 2 and 5. These segments are urged together by a spring 71, and retaining pins 72 project into the holes defined by the segments. A threaded ring 73 restrains the entire thrust pin 50. In order to prevent accidental loosening of the threaded ring 73, three projections 75 are provided on a cover plate 74 so as to permit turning of the threaded ring 73 only after bending up or removal of the cover 74. The threaded ring 73 is designed so that it serves as an extractor for the shaft of the thrust pin 51. In this regard, a ball 81 is provided which rests in a recess 80 formed in the base of the pin. A resilient ring presses against the ball. A bead 76 is provided on the threaded ring 73 and serves as an extractor during disassembly.

Figure 3:
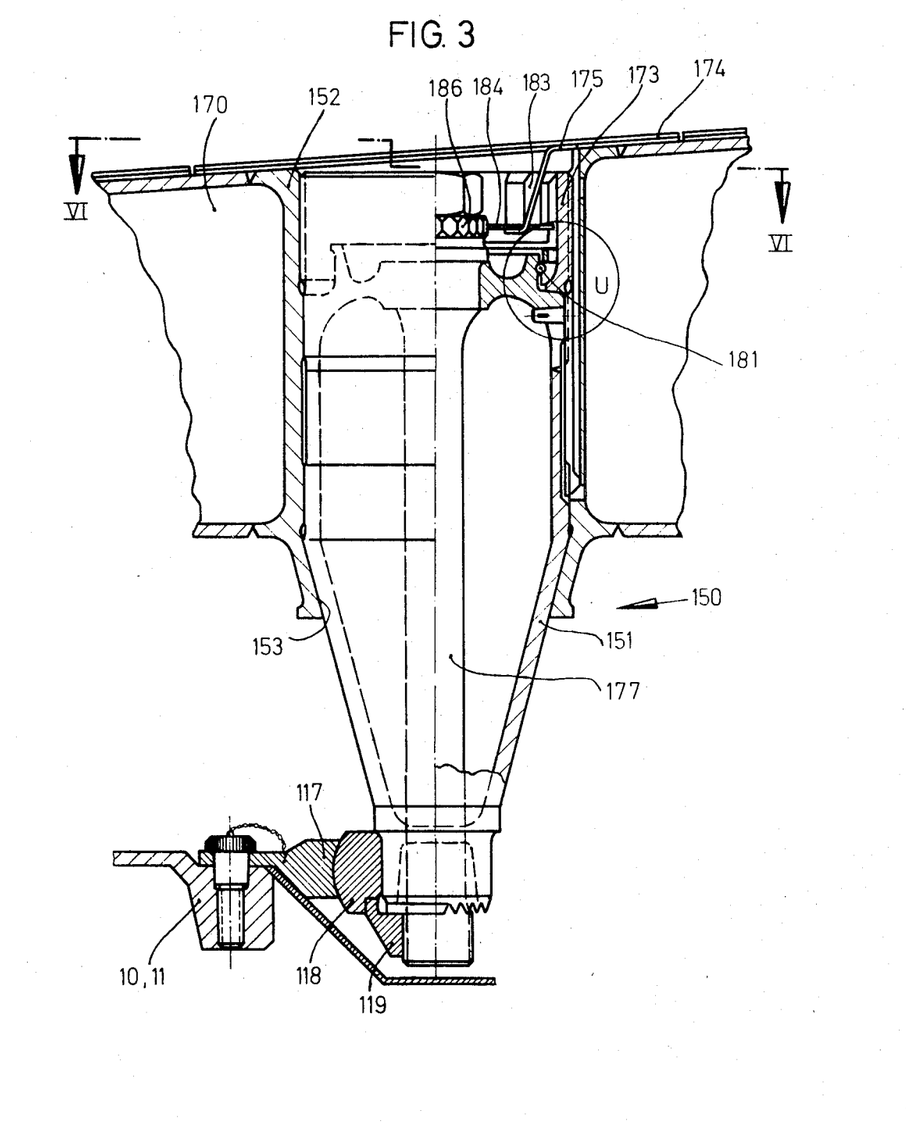
FIG. 3 is a partial, sectional view through an alternate embodiment of the component illustrated in FIG. 1.
Figure 6:
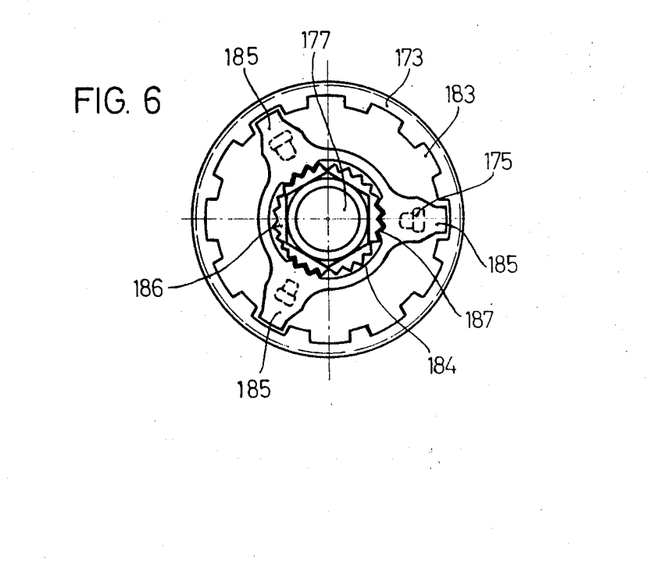
FIG. 6 is a sectional view taken along the line VI-VI of FIG. 3.
Figure 7:
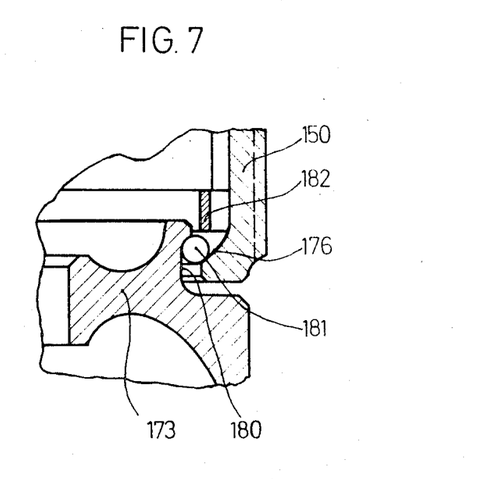
FIG. 7 is an enlarged, partial, sectional view of detail U of FIG. 3.

With particular reference to the alternate embodiment of FIG. 3, a thrust pin 150 is illustrated which is suitable for suspending the aircraft engines to transmit engine thrust to the airframe. In a frame 170, there is also defined a housing 152. One end of the housing 152 is tapered as at 153, which bears against a taper provided upon the outer surface of the shaft of a thrust pin 151. A threaded ring 173 is provided with a channel 176 (FIG. 7) and serves as an extractor. The surface of the channel 176 is in working contact with a ball 181 resting in a groove 180 and with a ring 182. The locking elements of the threaded ring 173 cooperate with a tension bolt 177 through which the additional tensile loads in the axial direction are transferred. The tension bolt 177 is provided with a left-hand thread (FIG. 6). In this case, the threaded ring 173 has a right-hand thread and includes outwardly extending radial flutes 183 on its peripheral surface. A locking disc 184 provided with three arms 185 selectively engages certain of the flutes 183. The tension bolt 177 includes a toothed shoulder 186 into which teeth 187 of the locking disc 184 engage and thus prevent rotation of the thrust pin 150. In addition, a finger 175 of a handhole cover 174 project through the locking disc 184 and thus prevent relative movement thereof.

Figure 8:
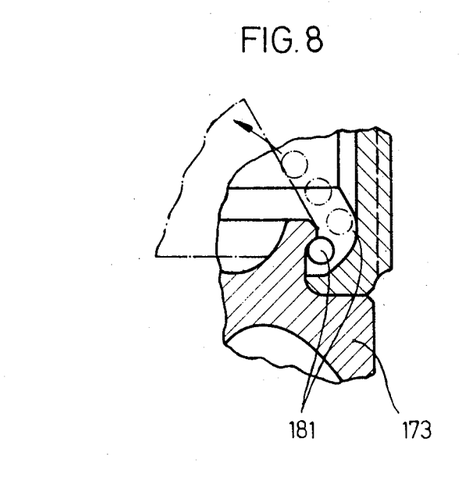
FIG. 8 is an enlarged, partial, sectional view of detail U during disassembly with a component of the assembly removed to better illustrate certain features of the embodiment.
Figures 9, 10, 11:
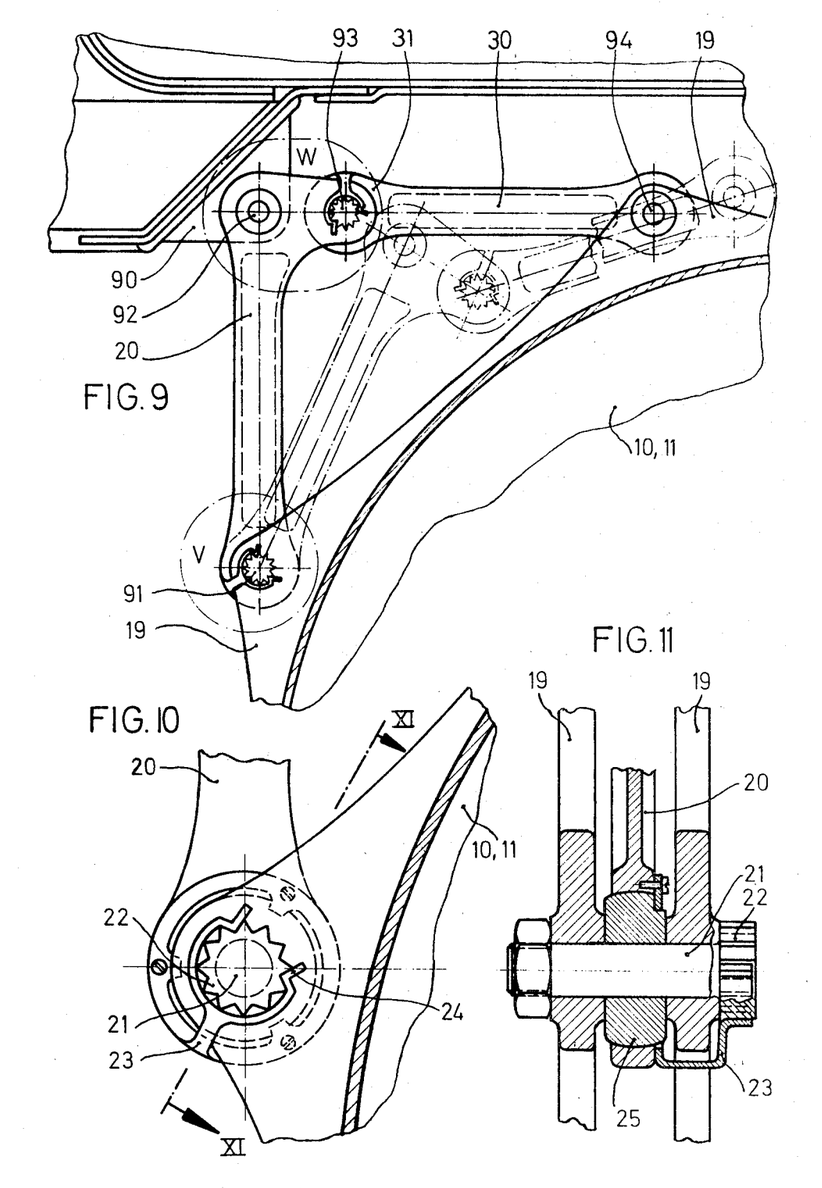
FIG. 9 is a partial, sectional view of the mounting rod device.
FIG. 10 is an enlarged, partial, sectional view of detail V of FIG. 9.
FIG. 11 is a sectional view of detail V along the line XI-XI of FIG. 10.

Threaded upon the tension bolt 177 nearest the engine is a lock nut 119. The lock nut 119 is shrunk onto a ball joint 118 and secures the latter to the tension bolt 177. This ball joint 118 engages with a bearing ring 117 defining a spherical inwardly disposed surface. The bearing ring 117 is rigidly connected to the engine 10 or 11. FIG. 8 shows the disassembled position with the ring 182 removed. The threaded ring 173 is screwed upwardly, as viewed in FIG. 8, until the upper surface of the ring 173 rests upon the lower surface of the thrust pin. Upon the application of a slight upward pressure upon the ball 181, it may be shifted in the direction of the arrow and thus removed.

FIGS. 9 through 14 illustrate the connecting mechanism for the rod 20 forming a component of the mounting means illustrated in FIG. 1. The rod 20, which is perpendicular to the Y-axis of FIG. 1, projects into the opening of a boss 19 which is provided upon the engines 10 and 11. A positive connection between the rod 20 and the engines 10 and 11 is supplied by a bolt 21. This bolt 21 has a notched ring 22 into which projecting arms 24 of a combined centering and retaining member 23 engage. The rod 30 has a similar device on the end adjacent the engine. In the event either of the engines 10 or 11 is disconnected from the airframe 90, the angle between the rods 20 and 30 can be adjusted, as shown in phantom, only upon the application of considerable force against the detent resistance produced by the devices 21, 22, 23, and 24. In this way, damage to the fuselage by the rods during removal or installation is prevented. The various points at which the rod is attached, that is points 91, 92, 93, and 94, are similarly designed. Point 91 of rod 20 corresponds to point 93 of rod 30, and point 92 is constructed similarly to point 94.

Figures 12, 13:
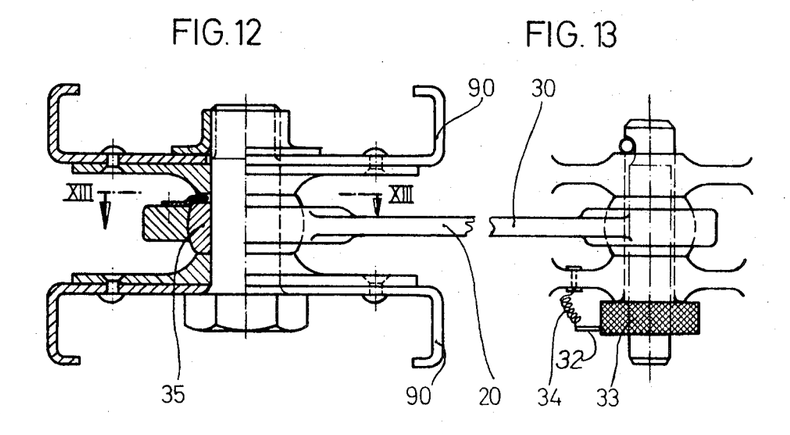
FIG. 12 is a partial, sectional view of the airframe attachment point at detail W illustrating an alternate embodiment of this invention.
FIG. 13 is a view of a swivel joint forming a component of the apparatus illustrated in FIG. 1.
Figure 14:
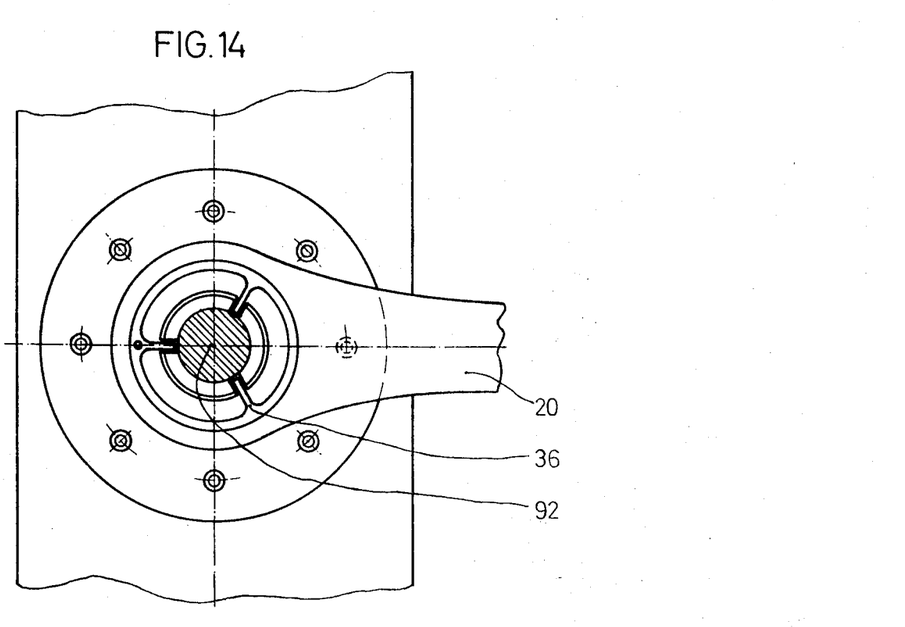
FIG. 14 is a sectional view taken along the line XIII-XIII of FIG. 12.

Each of the above-mentioned rod attachment points have spherical joints 25 and 35. Joint support points 92 and 94 each include a centering disc 36 which serves to place the rods 20 and 30 in a zero position. The zero position is termed as the nondeflected position of a particular attaching rod. The pivot pins may, as is shown in FIG. 13, be locked with a retaining pin 32 the sleeve of which is held captive by a chain 34.

The rods 40 are constructed similarly to the rod 20, except that they do not include a third hole for the bearing point 93. The bearing 41, rod 40, and thrust pin 50 form an improved mounting apparatus for a jet engine.

Although several specific embodiments of this invention have been herein shown and described, it should be understood that certain details of the construction shown may be altered without departing from the spirit and scope of this invention.

I claim:

1. An engine mount for an aircraft fuselage particularly adapted for use with short or vertical takeoff aircraft comprising mounting rods secured to the aircraft engine in two mounting planes, each of said mounting rods being attached at one end to the aircraft fuselage and at the other end to the aircraft engine, said mounting rods being along an axis not coincident with the centerline of said engine, at least one thrust pin associated with said mounting rods, retaining means between said one end of each of said rods and said fuselage for preventing relative pivotal movement therebetween, and yielding detent means between said aircraft engine and said other end of each of said rods for retarding pivotal movement therebetween, whereby said retaining means and said detent means maintain said rods in their normal operative position during engine removal.

2. An engine mount in accordance with claim 1 wherein said mounting rods are oriented generally perpendicular to the Y-axis of said aircraft and one of said rods is adjacent to the engine inlet and including a further mounting rod generally perpendicular to the Z-axis and being adjacent to the engine inlet.

3. An engine mount in accordance with claim 2 wherein another of said rods oriented perpendicular to the Y-axis of said aircraft is positioned adjacent the forward support point of the nozzle of said engine, and the axis of said thrust pin is parallel to the Z-axis of the aircraft.

4. An engine mount in accordance with claim 3 wherein at least one end of each of said rods is provided with a spherical joint.

5. An engine mount in accordance with claim 4 wherein the end of said thrust pin associated with said engine being provided with a spherical joint and further being freely movable along its longitudinal axis.

6. An engine mount in accordance with claim 5 wherein said rod mounted in the plane adjacent the engine nozzle and said thrust pin together with a bearing device form a single integral unit.

7. An engine mount in accordance with claim 6 wherein said detent means comprises resilient members provided upon both said thrust pin and said rods so as to permit centering, restraining, guiding and positioning thereof.

8. An engine mount in accordance with claim 7 wherein a tension bolt is associated with said thrust pin so as to facilitate transmittal of tensile loads along the axial direction of said tension bolt.

9. An engine mount in accordance with claim 8 wherein a threaded ring having internal flutes is associated with said thrust pin, retaining means in the form of balls being associated with said threaded ring so as to facilitate the use of said ring as an extractor for said thrust pins.

10. An engine mount in accordance with claim 9 wherein said tension bolt and said ring are threaded in opposite directions, a locking means, a closure plate, said locking means engageable with said closure plate so as to prevent relative motion therebetween, the head of said tension bolt being connected with said internal flutes of said threaded ring.

11. An engine mount in accordance with claim 10 wherein one end of said thrust pin is tapered, a three-section double-tapered ring receiving and supporting the tapered end of said thrust pin.